(12) United States Patent
Reggio et al.

(10) Patent No.: US 9,696,698 B2
(45) Date of Patent: Jul. 4, 2017

(54) METHOD AND SYSTEM FOR HANDLING BATCH PRODUCTION WITHIN ANSI/ISA/95 PRODUCTION SCHEDULING EXTENDED WITH BATCH PRODUCTION PARAMETER HISTORIAN

(71) Applicant: SIEMENS AKTIENGESELLSCHAFT, Munich (DE)

(72) Inventors: Elena Reggio, Genoa (IT); Alessandro Raviola, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 916 days.

(21) Appl. No.: 14/020,143

(22) Filed: Sep. 6, 2013

(65) Prior Publication Data
US 2014/0067105 A1    Mar. 6, 2014

(30) Foreign Application Priority Data

Sep. 6, 2012   (EP) .................................. 12183309

(51) Int. Cl.
*G06F 19/00* (2011.01)
*G05B 15/02* (2006.01)
(Continued)

(52) U.S. Cl.
CPC ............ *G05B 15/02* (2013.01); *G06Q 10/06* (2013.01); *G06Q 50/04* (2013.01); *Y02P 90/30* (2015.11)

(58) Field of Classification Search
CPC ........ G06Q 10/06; G06Q 50/04; Y02P 90/30; G05B 15/02
(Continued)

(56) References Cited

U.S. PATENT DOCUMENTS

2006/0250248 A1* 11/2006 Tu ........................... G06Q 10/06
                                                        340/572.4
2007/0294450 A1* 12/2007 Rudnick .......... G05B 19/41865
                                                        710/244
(Continued)

FOREIGN PATENT DOCUMENTS

EP          2365410 A1      9/2011

OTHER PUBLICATIONS

Integrating ISA-88 and ISA-95 by Bianca Scholten dated Oct. 2007.*
(Continued)

*Primary Examiner* — Ziaul Karim
(74) *Attorney, Agent, or Firm* — Laurence Greenberg; Werner Stemer; Ralph Locher

(57) ABSTRACT

We add a new entity Production Parameter History to the ISA-95 Production Schedule Model, thereby extending the model. The new entity stores the recent history of the values assumed by a subset of batch parameters most relevant for production control and resource planning, thus without the ERP system being charged with retrieving the historian from a log or from a warehouse in order to schedule the plant production. Putting together the batch information present in the ISA-95 Segment Requirement and the new Production Parameter History, the MES creates and stores a fully Electronic Batch Record close to a real situation found during product manufacturing. The MES system can provide the Electronic Batch Record to the ERP system through the ISA-95 Production Performance model extended thereof, since a production performance report is made up of a set of one or more Production Responses associated with Production Requests.

6 Claims, 6 Drawing Sheets

(51) Int. Cl.
*G06Q 10/06* (2012.01)
*G06Q 50/04* (2012.01)

(58) Field of Classification Search
USPC .......................................................... 700/97
See application file for complete search history.

(56) References Cited

U.S. PATENT DOCUMENTS

| | | | | |
|---|---|---|---|---|
| 2008/0010641 | A1* | 1/2008 | Zhao | G05B 23/0264 718/101 |
| 2011/0098834 | A1* | 4/2011 | Couronne | G06Q 10/06 700/100 |
| 2011/0224814 | A1* | 9/2011 | Mazzarone | G05B 19/418 700/97 |
| 2013/0124465 | A1* | 5/2013 | Pingel | G06F 3/0604 707/610 |

OTHER PUBLICATIONS

Empowering the enterprise level with historians by Mike Bowbyes dated Aug. 2012.*
Bowbyes, M., "Empowering the enterprise level with historians", Jul./Aug. 2012, InTech, pp. 1-5, URL: http://www.isa.org/InTechTemplate.cfm?template=/ContentManagement/ContentDisplay.cfm&ContentID=90131.
Scholten, B., Integrating ISA-88 and ISA-95; ISA, Oct. 2007, pp. 1-13, URL: http://www.isa.org/filestore/Division_TechPapers/GlassCeramics/Integrating_TP07EXPO140.pdf.

* cited by examiner

METHOD AND SYSTEM FOR HANDLING BATCH PRODUCTION WITHIN ANSI/ISA/95 PRODUCTION SCHEDULING EXTENDED WITH BATCH PRODUCTION PARAMETER HISTORIAN

CROSS-REFERENCE TO RELATED APPLICATION

This application claims the priority, under 35 U.S.C. §119, of European patent application EP 12 183 309.9, filed Sep. 6, 2012; the prior application is herewith incorporated by reference in its entirety.

BACKGROUND OF THE INVENTION

Field of the Invention

The present invention lies in the information technology field. It relates to the field of Information Technology (IT) for the enterprise-control system integration, and more precisely to a method and system for handling batch production parameter historian within ANSI/ISA/95 production scheduling extended thereof.

The ANSI/ISA/95 standard (hereafter referred to as ISA-95) is universally adopted by manufacturers to achieve integration between Manufacturing Execution Systems (MES) and Enterprise Resource Planning (ERP). As reported by Dennis Brandl in an article entitled "Business-to-Shop Integration Realized Through B2MML" (to be discussed in the following): ISA-95 has been extremely successful in reducing the average time for integration projects from years to months. It has also been a key part of the improvement in integration project success rates from under 30% to over 80%. Parts 1, 2, 4, and 5 of the ISA-95 standards define a standard terminology that can be easily understood by scheduling, supply chain, and shop floor personnel. The terminology defines the information that is normally exchanged between business and shop floor systems without using vendor-specific or industry-specific terminology. Part 2 defines a standard terminology for describing the many different aspects of material information, such as material lot, material sublot, material definitions, and material classes.

With more specific detail, ISA-95 standards are composed of the following six parts:
Part 1: Models and Terminal ANSI/ISA/95 terminology;
Part 2: Object Model Attributes;
Part 3: Activity Models;
Part 4: Object models and attributes of manufacturing operations management activities;
Part 5: Business-to-manufacturing transactions;
Part 6: Manufacturing operations transactions.

These ISA-95 standards give rise to transactions between ERP and the Manufacturing Operations Management (MOM), and vice versa. As described in Part 5, these transactions are software implementable by way of a coordinate exchange of messages.

Further by Dennis Brandl: ISA-95 provides the standard terminology for integration but does not define the actual format for the data or the technical methods used to exchange data. This is where the B2MML standard comes into play defining a format for exchange of ISA-95 information and defining the specific method for exchanges, namely, XML documents. B2MML is what makes the ISA-95 standards implementable.

More precisely, the ISA-95 data model consists of a set of eXtensible Markup Language (XML) schemas constituting a Business to Manufacturing Markup Language (B2MML). XML schemas are written using the "World Wide Web Consortium's (W3C) XML Schema language", also known as XML Schema Definition (XSD). XSD schemas are freely available at the WEB site of the World Batch Forum (WBF) www.wbf.org, or at the WEB site of the Manufacturing Enterprise Solutions Association (MESA) www.mesa.org. WBF and MESA are going to merge together.

FIG. 1 (FIG. 3 of ISA-95, Part 1) is a conceptual model of "Multilevel Hierarchy of activities" that includes five protocol levels (layers) represented by ellipses. Batch Control, Continuous Control, and Discrete Control, grouped together at the lowest levels 0, 1, 2, are detailed in the former ISA-88 standard. At the intermediate level 3 the Manufacturing Operation System (MES) executes Manufacturing Operations & Control activities, such as: Dispatching Production, Detailed Production Scheduling, and Reliability Assurance. At the highest level 4 the Enterprise Resource Planning (ERP) is charged with Business Planning & Logistics, such as Plant Production Scheduling and Operational Management. The interface between MES and ERP is described in ISA-95 Part 1 and Part 2. Deployment of ISA-95 for enterprise management and factory automation, requests a preliminary engineering phase to define all involved production parameters. At execution phase, the parameter values have to be actualized and managed by the MES system in a well-performing way, especially if the MES system is integrated with a Batch Control system. In this last case, in fact, the values come directly from the factory electronics, such as: Programmable Logic Controllers (PLC), sensors, actuators, etc., using high speed acquisition rules, for example, the Supervisory Control and Data Acquisition (SCADA) within a Distributed Control System (DCS). Scheduling defines the business-related activities needed to manage a manufacturing organization. For example, a basic plant schedule mainly involved with material use, delivery, and shipping, is able to determine inventory levels and making sure that materials are delivered on time to the right place for production.

Production scheduling has technical and non-technical twofold aspect that also reflects in methods and systems of its implementation. The technical aspects are not only tied to the details of how a single production equipment or device shall be configured to correctly operate, and how the operating steps must be correctly sequenced, but even what information elements shall be included in the production schedule model and how these elements shall be handled by the business software. These two last aspects of the technical software are very important, since they might lead to a net improvement of the production efficiency and the safety as well. Because of the generality of ISA-95, there is room for developing original customer solutions in this direction without infringing the standard, but extending it to encompass new opportunities. In practice every standard is continuously upgraded by new proposals (Requests for change).

FIG. 2 (see ISA-95, FIG. 20 of Part 2) shows the Production schedule model adopted by this standard. The model includes many instances (blocks) arranged in a tree-like structure which are built in accordance with the rules reported in Table 1 of ISA-95 Part 2. Each block instantiates a specific model or a class of objects: they are listed below, with the information in square brackets pointing to the relevant paragraphs of ISA 95.00.02 CDV04© 2009 ISA.
Production Schedule 10—[A.2.1 and 2].
Production Request 11—[A.2.3].

Requested Segment Response 12—[A.2.3].
Segment Requirement 13—[A.2.3].
Product Production Rule 14—[A.2.3].
Product Segment or Process Segment 15—[A.2.3].
Production Parameter 16—[A.2.4].
Personnel Requirement 17—[6.2.6].
Equipment Requirement 18—[6.2.8].
Physical Asset Requirement 19—[6.2.10].
Material Requirement 20—[6.2.12].
Parameter Specification 21—[6.1.6].
Personnel Requirement Property 22—[6.2.7].
Equipment Requirement Property 23—[6.2.9].
Physical Asset Requirement Property 24—[6.2.11].
Material Requirement Property 25—[6.2.13].
Personnel model—[5.1.1].
Equipment model—[5.2.1].
Physical asset model—[5.3.1].
Material model—[5.4.1].

For each batch procedural element that will be modelled within Segment Requirement 13 the following information elements have to be archived:

Element Name and identifier (ID).
Start/end time of the procedural element.
End time of the procedural element.
Type of procedural element.
Unit name.
Each procedural element has parameters:
Process Parameters (PP).
Input/Output Material Parameters (PI/PO).

These parameters will be modelled within Production Parameter 16. For each Process Parameter, the following information elements have to be collected:

Parameter name.
Data type and units of measurement of the parameter.
Parameter value (actual/set point).
High/Low value.

For each PI/PO parameter, additional information is collected:

Material name and code.
Actual/Planned amount.

Unfortunately the model for production parameters provided in ISA-95 does not optimize the interoperation with the factory field level (the batch); in fact this standard is focused on the exchange of information between the ERP system at level 4 and the MES system at level 3. It lacks the ability to capture all necessary details of data and summarize them in a format that is useful as a Batch record, when the MES system is integrated into a Batch Control system.

The above shortcoming of the ISA-95 data model was highlighted by Bianca Sholten in the article entitled: "Integrating ISA-88 and ISA-95," presented at ISA EXPO 2007, 2-4 Oct. 2007, Reliant Center, Houston, Tex. The article may be considered as background art for the invention described herein. The introductory part of the article includes a brief history of the two standards aimed to underline the main differences, while the end part suggests a criterion for integration. ISA-88 and ISA-95 differ in terms of their purpose, so that manufacturing companies will use ISA-88 for automating the control of machines and devices, and ISA-95 for the exchange of information between ERP and MES systems. MES software users and developers in particular, must choose when to use ISA-88 models and when to use ISA-95 models. The suggested criterion for integration is, literally: "In our company we decided to use the best from both standards (see FIG. 5, "of this article"). The upper part of the data model shows the ISA-95 Product Definition model and the lower part shows the ISA-88 Master Recipe, with a Procedure, a Unit Procedure, an Operation and a Phase. This way the system is capable of speaking ISA-95 with the ERP system on the higher level and speaking ISA-88 with the lower level Batch Control system."

Dennis Brandt, in the article entitled: Business-to-Shop Integration Realized Through B2MML, published on the WEB on July/August 2012, isa.org, proposes implementing the Business-to-Manufacturing Markup Language (B2MML) as a standard format to exchange data between MES and the field, provided that, as obvious, the traditional use of B2MML in exchanging data between MES and ERP is maintained. Because B2MML is a globally understood format, one application does not have to know the structure of data in other applications. B2MML thus provides a way to commonly represent a wide range of manufacturing operational information. B2MML defines schemas for each of the object models defined in ISA-95. B2MML schemas include: the personnel, role-based equipment, physical asset, material, definitions, capability, schedule, and performance models. The schema-set of B2MML also includes support for the ISA-88 standard, including recipes, equipment models, general recipes, and batch production records. Furthermore, ISA-95 Part 5 defines standard two-way transactions, such as GET/SHOW and PUBLISH/SUBSCRIBE, defining what data have to be returned or the action to happen during the transactions for exchanged information through a two-way communication protocol. B2MML supports the ISA-95 transaction definitions using message headers, which contain the transaction's command, response, and sender and receiver addresses. Adopting this formalism, the ISA-88 data model should be implemented in analogy with ISA-95 is done.

Michael Bowbyes, in an article entitled: Empowering the Enterprise Level with Historians, published in the WEB on July/August 2012, isa.org, proposes implementing a Service Oriented Architecture (SOA) based on a Open Standard Message Bus directly accessible by the whole host applications, people, and data sources in the organization, for easy interaction with each other to exchange the needed information. By means of this open information bus, data are captured and analyzed in real-time while at the same time being archived for later use. Likewise, the visualization tools not only provide access to historical data but can also subscribe and visualize real-time data. Process engineers, for example, still require extensive historical information for complete offline analysis, but they may also want instant notification of certain conditions that may be identified by just a few variables. The suggested approach improves the quality of the historical batch data put at the business management disposal.

With reference to the first cited article (Bianca Sholten)—Developers who implement the suggested radical approach, shall adopt two different standards together instead of the latest ISA-95 only. Besides, the User Requirement Specifications (URS) for any new system are faced with the additional demanding task of dividing the Product Definition information received from level 4 of ISA-95 into ISA-95 Segments, which are related to ISA-88 Master Recipe. The same shall be done for the ISA_95 models of Production Schedule and Production Performance Information, in that case ISA-95 Segments relate to ISA-88 Control Recipes. In conclusion, since the two standards work mostly separately, the proposed integration of ISA-88 and ISA-95 does not foresee any extension of ISA-95 production model to encompass the features of ISA-88.

With reference to the second cited article (Dennis Brandl)—The following XML schemas are provided to implement the ISA-88 data model:

| | |
|---|---|
| BatchML-V05-Batchinformation.xsd | ISA-88 Recipe, Equipment, and Batch List models |
| Batch ML-V05-BatchProductionRecord.xsd | ISA-88 Batch Production Record models |
| BatchML-V05-GeneralRecipe.xsd | ISA-88 General and Site Recipe models |

Similarly to the first-cited article, the ISA-95 production model is not extended to encompass the features of ISA-88; in fact there are different XML schema-sets for the two standards.

With reference to the third cited article (Michael Bowbyes)—The all-embracing architecture described there, despite its capability to transfer actual data directly from the field to the business systems, yet deploys one or more relational databases for preserving historical batch data as done in the traditional batch systems based on ISA-88. As a consequence the business software shall submit SQL queries to these databases in order to retrieve historical batch data needed for scheduling the specific production, so this usual procedure doesn't contribute to render more efficient the scheduling process.

Other opportunities lie within the scope of those of skill in the art. To solve the underlined problem with ISA-95, some new custom tables should be introduced in the MES database to provide the capability to store Batch information. The main drawback of this solution is that the user has to manage the extension through one's own application. Alternatively the additional data can be managed through proper custom fields, but that approach presents problems from the performances point of view and that can be not acceptable in such a scenario.

BRIEF SUMMARY OF THE INVENTION

It is accordingly an object of the invention to provide a method and system for handling batch production which overcome the above-mentioned disadvantages of the heretofore-known devices and methods of this general type and which provides for an improvement in the efficiency of the Production Schedule as presently modelled within ISA-95 standards, as far as batch data handling is concerned.

With the foregoing and other objects in view there is provided, in accordance with the invention, a method for handling batch production parameters within production scheduling, the method comprising:
a) modeling a production process in response to a production request by adopting predetermined product production rules for decomposing the process into segments of process or product, wherein each segment may contain requirements selected from the group consisting of production parameters, personnel, equipment, physical assets, materials, and any parameter needed for building a segment of product or process within an ISA-95 standard;
b) executing the scheduled production for the production request and while performing the executing step:
c) exporting batch values of a given subset of batch production parameters most relevant for production control into similarly specified fields of production parameters contained in respective segments of product or process;
d) storing sequential values of exported batch production parameters in a database, wherein the database is configured to be queried by a planning entity in charge of planning the enterprise resources; and
e) providing a report to the planning entity with information regarding the execution in progress at step b), the report including an additional information element constituted by a selection of historical values of at least one of the exported batch production parameters, the report exploiting instances of a response model with a structure substantially corresponding to a segment of process or product extended to include the additional information element. Preferably, the structure is based on the ISA-95 production performance model appositely extended to host the additional information element.

In other words, the invention achieves the above and other objects by providing a method for handling batch production parameters within production scheduling, wherein the progress in the execution of the production is reported to the planning entity, the report including an additional information element constituted by a selection of historical values of at least one of the exported batch production parameters, the report exploiting instances of a response model with nearly the same structure of a segment, preferably the ISA-95 Production performance model appositely extended to host the additional information element.

According to one aspect of the invention, any segment of product or process modeled in step a) may contain an additional requirement constituted of the production parameter history.

According to one aspect of the invention, said historical values may be constituted of compressed values over pre-determined time intervals.

According to one aspect of the invention, the process or product segment requirements are described by a XML format including history tags.

With the above and other objects in view there is also provided, in accordance with the invention, a system for handling batch production parameters within production scheduling. The novel system includes:
first data processing means running an ERP software having instructions for scheduling a production process ensuing a production request;
second data processing means running a MES software having instructions for controlling and monitoring the execution of said production process by operating a plurality of production components located at the shop floor;
a two-way communication protocol run by both data processing means for exchanging information during reciprocal transactions;
a first routine of the MES software implementing predetermined product production rules for modelling the production process ensuing a production request, by decomposing the process into segments of process or product, every segment may contain requirements about: production parameters, personnel, equipments, physical assets, materials, and any other is needed for building a segment of product or process within ISA-95 standards presently in force;
a second routine of the MES software configured for exporting batch values of a subset of batch production parameters most relevant for production control into similarly specified fields of production parameters contained in respective segments of product or process;

a database accessible by the second data processing means for saving sequential values of each exported batch production parameter, the database may be queried by the first data processing means; and a third routine of the MES software configured for reporting to said first processing means information regarding the in progress production process execution, the report including an additional information element constituted by a selection of historical values of at least one of said exported batch production parameters, the report exploiting instances of a response model with nearly the same structure of a segment, preferably the ISA-95 Production performance model appositely extended to host said additional information element.

The new entity entitled Production Parameter History is added to the Production Schedule model by only extending the ISA-95 model thereof. This new entity is in charge of storing the most recent history of the values assumed by a subset of batch parameters most relevant for production control and resource planning, thus without the ERP system be charged with retrieval of the historian from the log or from a warehouse in order to schedule the plant production. Putting together the batch information present in the Segment Requirement and the new information element called Production Parameter History, the MES system is able to create and store a fully Electronic Batch Record close to a real situation that it could find during a product manufacturing, thus overcoming a lack in the ISA-95 standard.

The availability of the Electronic Batch Record in the MES system aids the operational efficiency improvement, through the optimum production batches and the deviation analysis. The MES system can provide the Electronic Batch Record to the ERP system through the standard Production Performance model extended thereof, since a production performance report is made up of a set of one or more Production Responses associated with Production Requests.

It is advantageous that, in accordance with the invention, the ISA-95 system architecture undergoes small modifications only.

Other features which are considered as characteristic for the invention are set forth in the appended claims.

Although the invention is illustrated and described herein as embodied in a method and system for handling batch production parameter historian within ANSI/ISA/95 (ISA-95) production scheduling extended thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
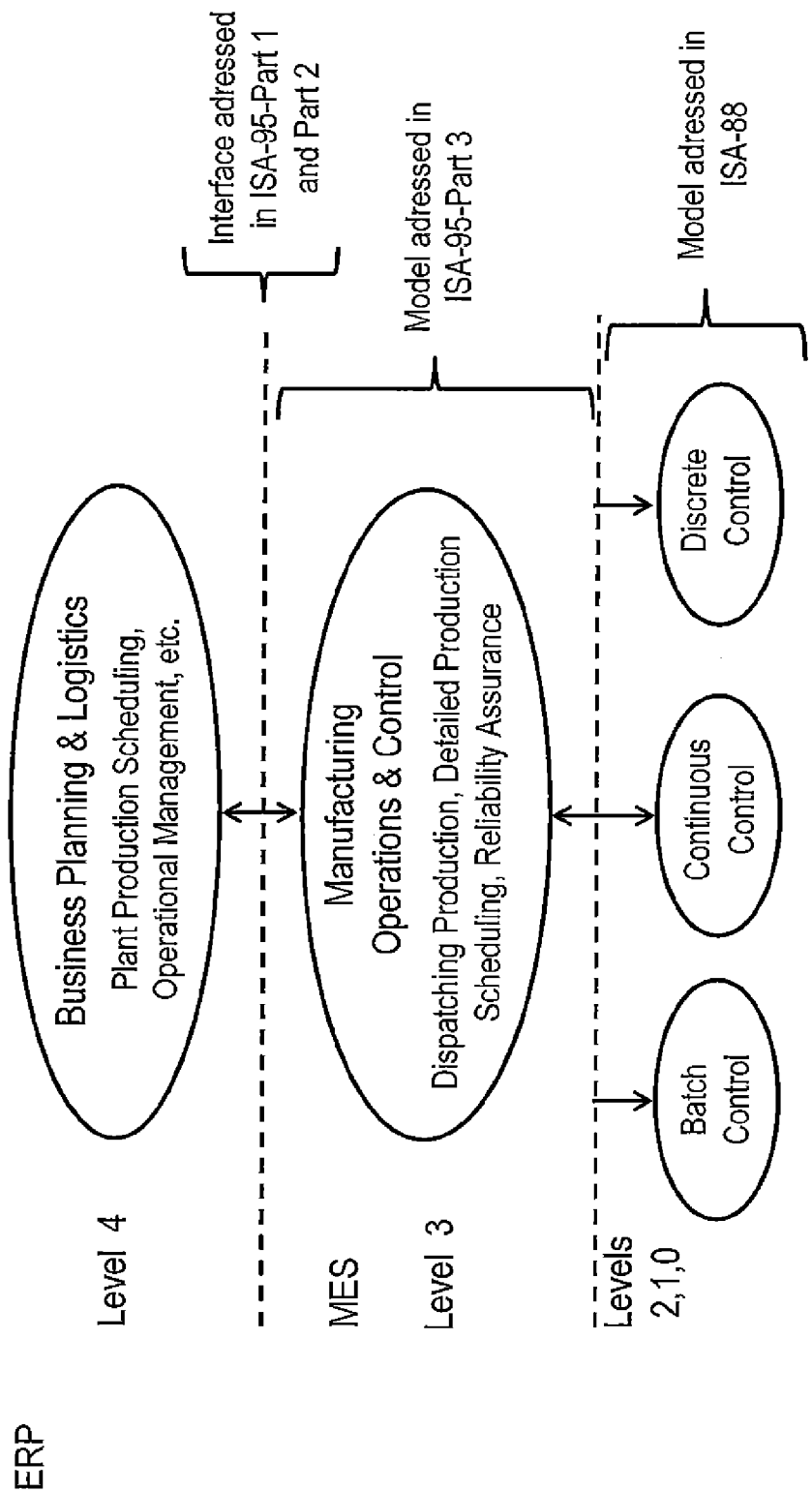
FIG. 1 is a schematic of the hierarchy of activities depicted in ISA-95, Part 1.
Figure 2:
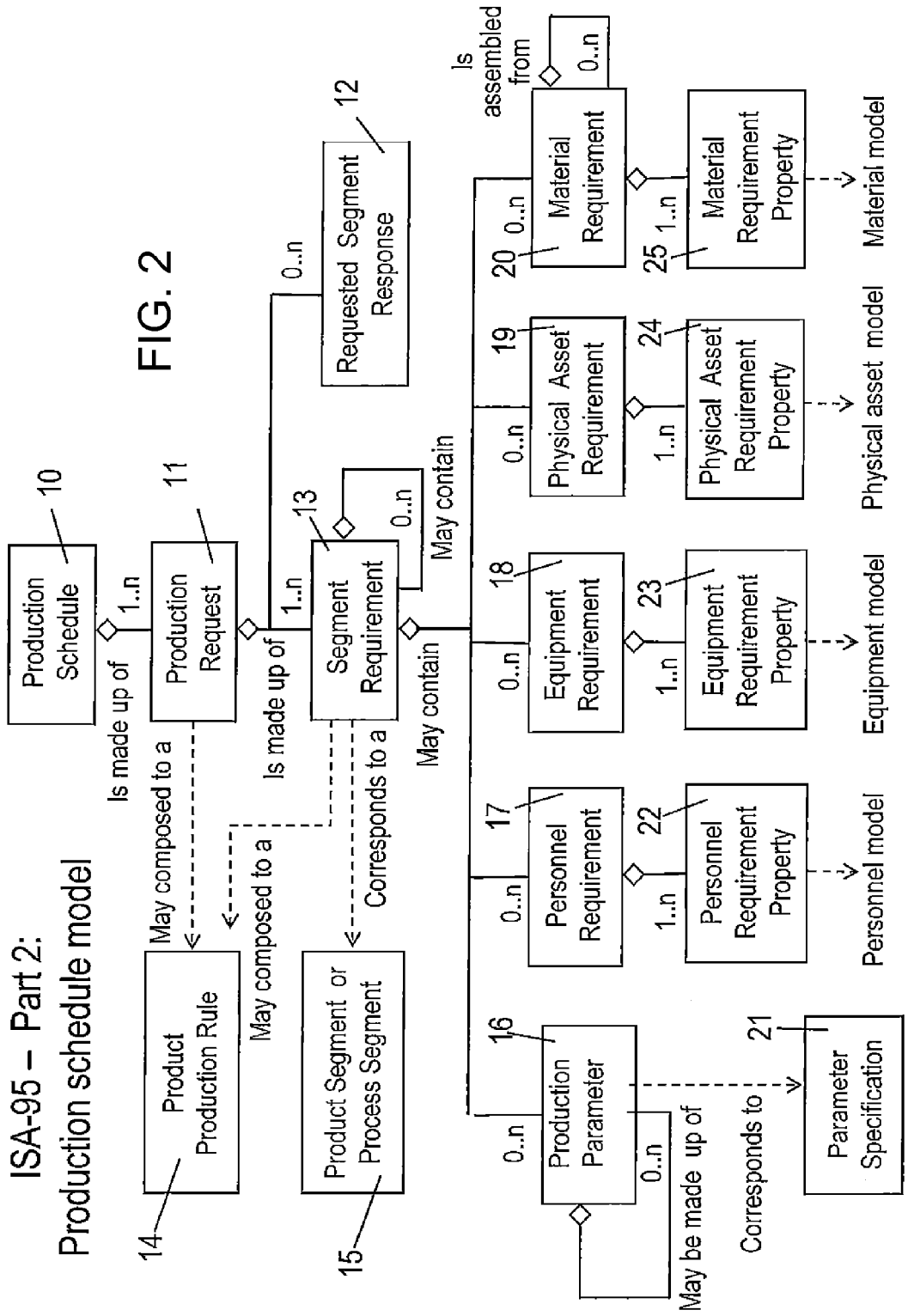
FIG. 2 is a schematic of the production schedule model depicted in ISA-95, Part 2.
Figure 3:
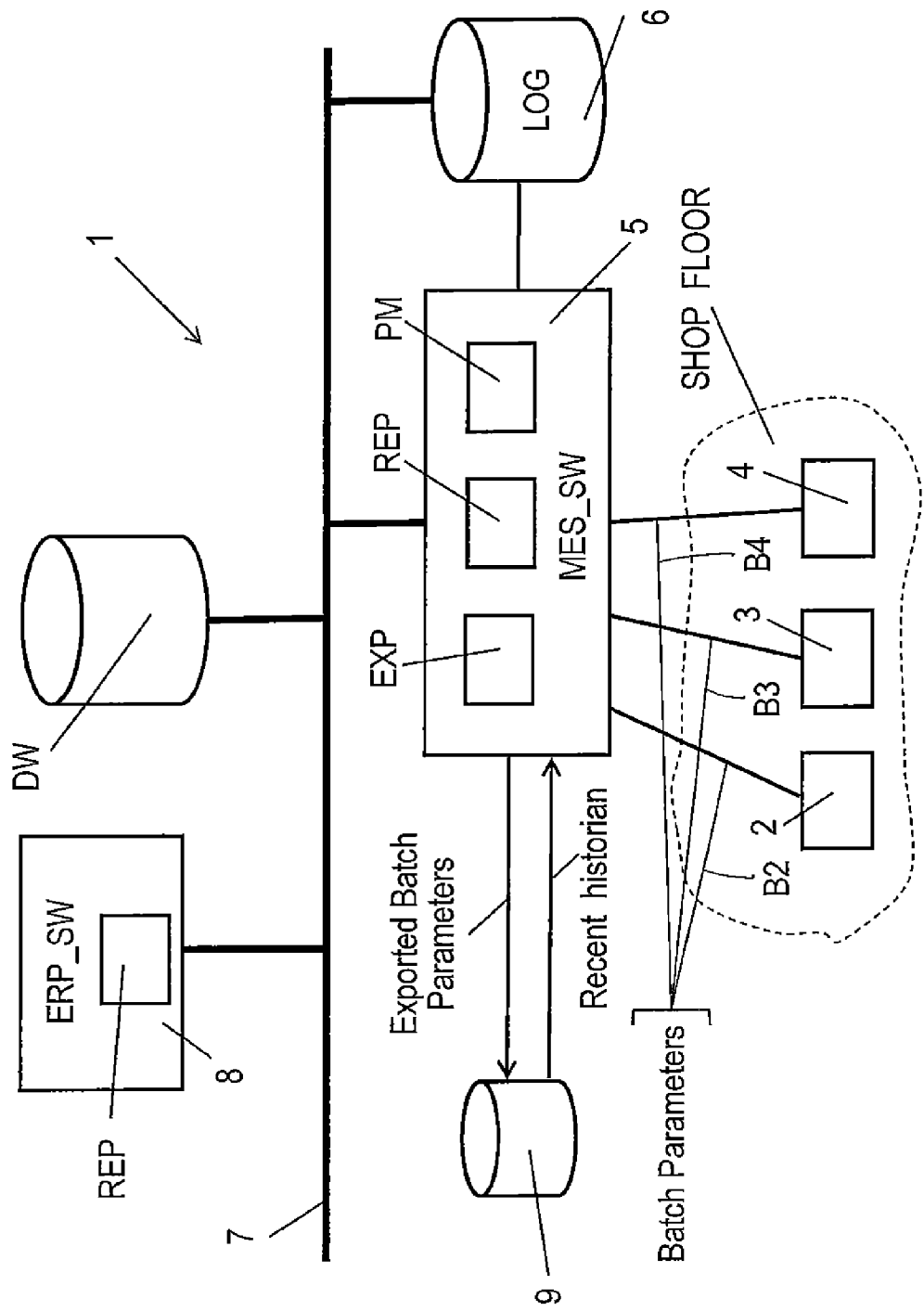
FIG. 3 shows a schematic overview of a system for handling batch production parameters within production scheduling in accordance with the present invention.

Referring now to the figures of the drawing in detail, FIG. 3 illustrates an enterprise management and control system 1 compliant with ISA-95 family of standards presently in force, except for some extensions aimed to improve the efficiency of production planning. With reference to FIG. 3, the system 1 includes a plurality of production components 2, 3, 4 located at the shop floor and constituted by equipments or devices operated at levels 0, 1, 2 as depicted in FIG. 1. These equipments or devices are connected to a data processing unit 5 by means of individual data links, or alternatively by a network. The data processing unit 5 runs a MES software (MES-SW) for operating and control said production components 2, 3, 4. The data processing unit 5 and the interconnected production components 2, 3, 4 can be replicated for n times depending on the actual plant requirements. The MES software implements a production modeler PM, an exporting routine EXP, and a reporting routine REP. The production components 2, 3, 4 generate sequential values B2, B3, B4 of respective batch production parameters of the type already specified in the description of FIG. 2. More in general, the values B2, B3, B4 are called tags. A tag is associated to a point which represents a single input or output value monitored or controlled by the system. Tags are normally stored as value-timestamp pairs: a value, and the timestamp when it was recorded or calculated. A series of value-timestamp pairs gives the history of that point. An alternative is that of collecting at each subsequent acquisition interval a tag including the initial timestamp, the end timestamp, and the associated variation of the monitored variable.

A communication link 7, preferably of the Ethernet type, connects the MES unit 5 to a data processing unit 8, which runs an ERP software (ERP_SW), also termed business software, and said reporting routine REP for two-way transactions, as defined in ISA-95 Part 5. A central database DW is a data warehouse accessible via the link 7 by both MES unit 5 and ERP unit 8. The dimension of data warehouse DW is maintained acceptable by means of known techniques, like lossless data compression and periodical backups. The LOG 6 is a second repository accessible at level 2 for storing raw data coming from the field. The LOG database can be accessed by the MES unit 5 directly and by the ERP unit 8 through the link 7. A third repository 9, with smaller size than the LOG 6, is accessed by the MES unit 5 (directly) to store sequential values of a subset of batch parameters and retrieve record of a recent historian of said parameters. Limitedly to the matter in common with the prior art, the system of FIG. 3 avails on what already said for describing the conceptual model of FIG. 1 and the Production schedule model of FIG. 2, most innovative aspects are instead supported by FIGS. 4 to 6. The production modeler PM in FIG. 3 includes specific instructions called Product Production Rules (PPR) aimed to perform a segmentation of the production process ensuing a production request (order). Segmentation involves process segments and product segments as defined in ISA-95. The Product segment is defined at the overlap between PPRs and the bill of resources. The product segment is a model that describes a job or task consisting of one of more work elements, usually done essentially in one location. The product segment is the most detailed process view for the business system to control material, labor, resource usage, cost, and quality in order to control the production. Product segments may correspond to:

IEC 61512-1 (ISA-88) process stages, process operations, unit procedures, or operations for batch manufacturing;
production unit operations for continuous manufacturing;
assembly steps and assembly actions for discrete manufacturing;
other types of identifiable time spans for other types of manufacturing.

The segment entity, either product or process, has the consistence defined above. When the production process is started, raw data begin to flow copiously from the field towards the MES unit 5. Typically, the database management at MES level and field level is different because not all production parameters managed at level 2 are relevant for the MES control at level 3 and for the ERP functionality at level 4. The database 9 stores the subset of batch data relevant for the MES. This repository is subjected to periodical refreshes that prevent the achievement of unmanageable size. Production Parameters that are not significant as decision-making support of the Enterprise have a history confined to the LOG at level 2. Certainly, process parameters that vary continuously in time (e.g. the temperature of a furnace) are not part of that subset having specific interest for the MES. The following are possible process parameters relevant for the MES:

the percentage of usage of a piece of equipment;
the number of daily pieces produced by a piece of equipment;
the number of faults of a piece of equipment;
the number discarded pieces.

Other parameters may depend on the type of process and the type of enterprise. Limitedly to those batch parameters relevant for the MES, the EXP routine contained in the MES software exports the relevant values into corresponding fields of Production Parameter 16. In this way raw data generated at Level 2 may participate to a well structured information model at Level 3.

Figure 4:
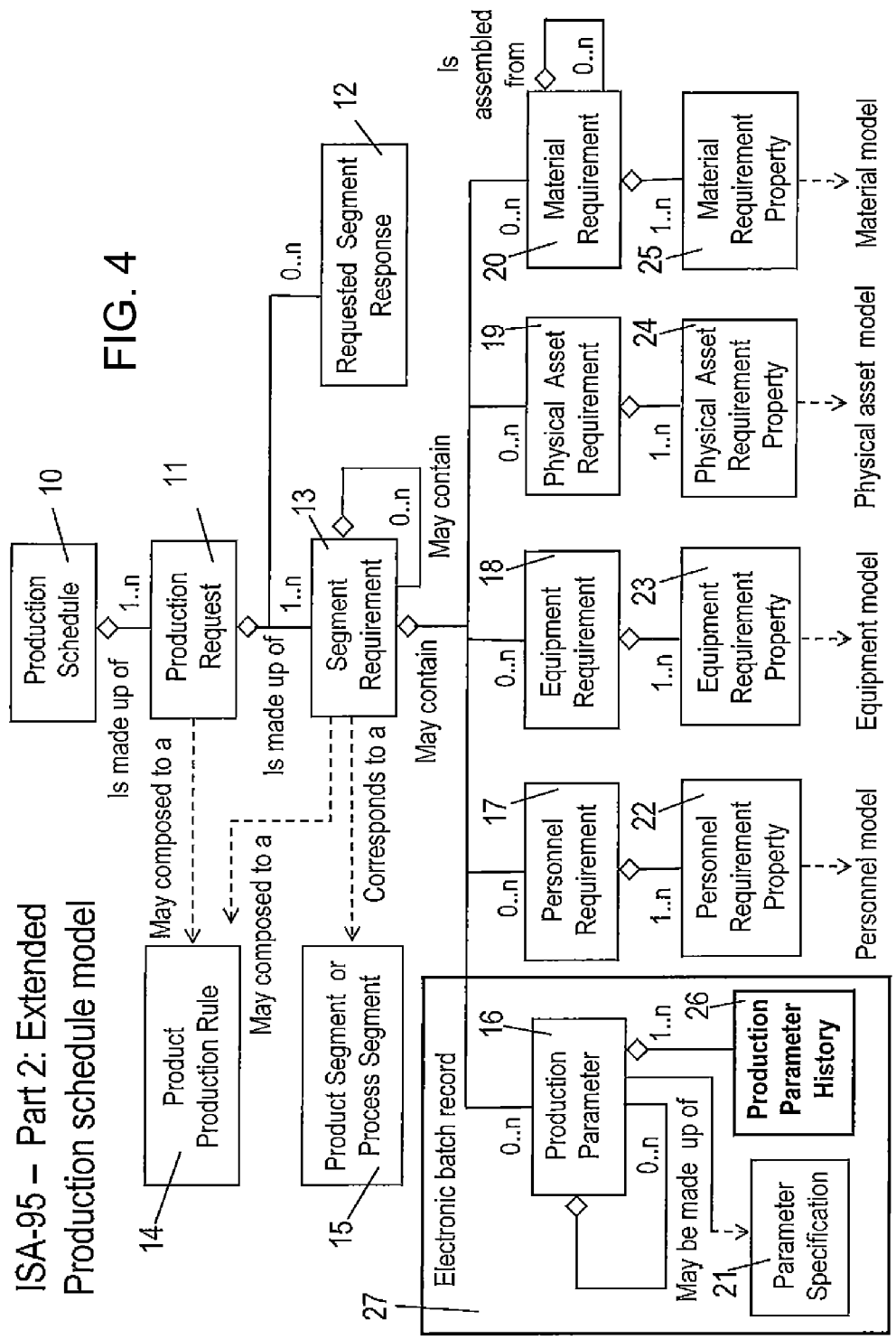
FIG. 4 is a view of the production schedule model of FIG. 2 extended according to the present invention.

With reference to FIG. 4, the production schedule model 10 is made up of one or more production requests 11. A production request 11 is a request for production for a single product identified by a product production rule 14. A production request 11 contains the information required by manufacturing to fulfil scheduled production. A production request contains at least one segment requirement 13, even if it spans all production of the product. A production request 11 may be reported on by one or more production responses. A segment requirement 13 corresponds to a Product Segment or a Process Segment 15. A segment Requirement 13 may contain the attributes 16-20 described in FIG. 2.

The Production schedule model of FIG. 2 is extended in FIG. 4 to include a new entity 26 called "Production Parameter History" which is added to the Production Parameter 16. Production parameters may be either product parameters that show some characteristics of the product (such as paint color), or process parameters that present some characteristics of the production process (such as bake time). All information contained in the enterprise system that is required by the operation system for correct production shall be known as production parameters. Examples of production parameters are:

quality limits;
set points;
targets;
specific customer requirements (such as purity=99.95%);
final disposition of the produced product;
transportation information;
other information not directly related to control (such as a customer order number required for labeling or language for labels).

The attributes for a production parameter are the same as for a segment parameter and are listed in Table 60 of ISA-95, Part 2, to say: ID, Description, Value, and Unit of Measure.

The new entity Production Parameter History 26 is an information element appositely added to the Production Parameter 16 for including the most recent history of the values assumed by every specific batch production parameter during the manufacturing process. More recent history is a wording which means a history spanning a period not longer than the refresh time of the MES repository 9, typically from few days to months depending on the type of product parameter. More in general, the proposed extension of ISA-95 may yet be viewed as an Electronic batch record 27 which encompasses the Production Parameter 16, the Parameter Specification 21, and the Production Parameter History 26. For example the Electronic batch record 27 for each instance of a given Production Parameter 16, could correspond to a Parameter Specification 21 that shall include:

an identification of the parameter;
the units of measure of the parameter value;
and should include:
a default value for the parameter or;
possible ranges of the parameter value;
besides, the same Production Parameter 16 shall include:
the history 26 of that parameter (bounded within the refresh time of the MES repository 9).

Figure 5:
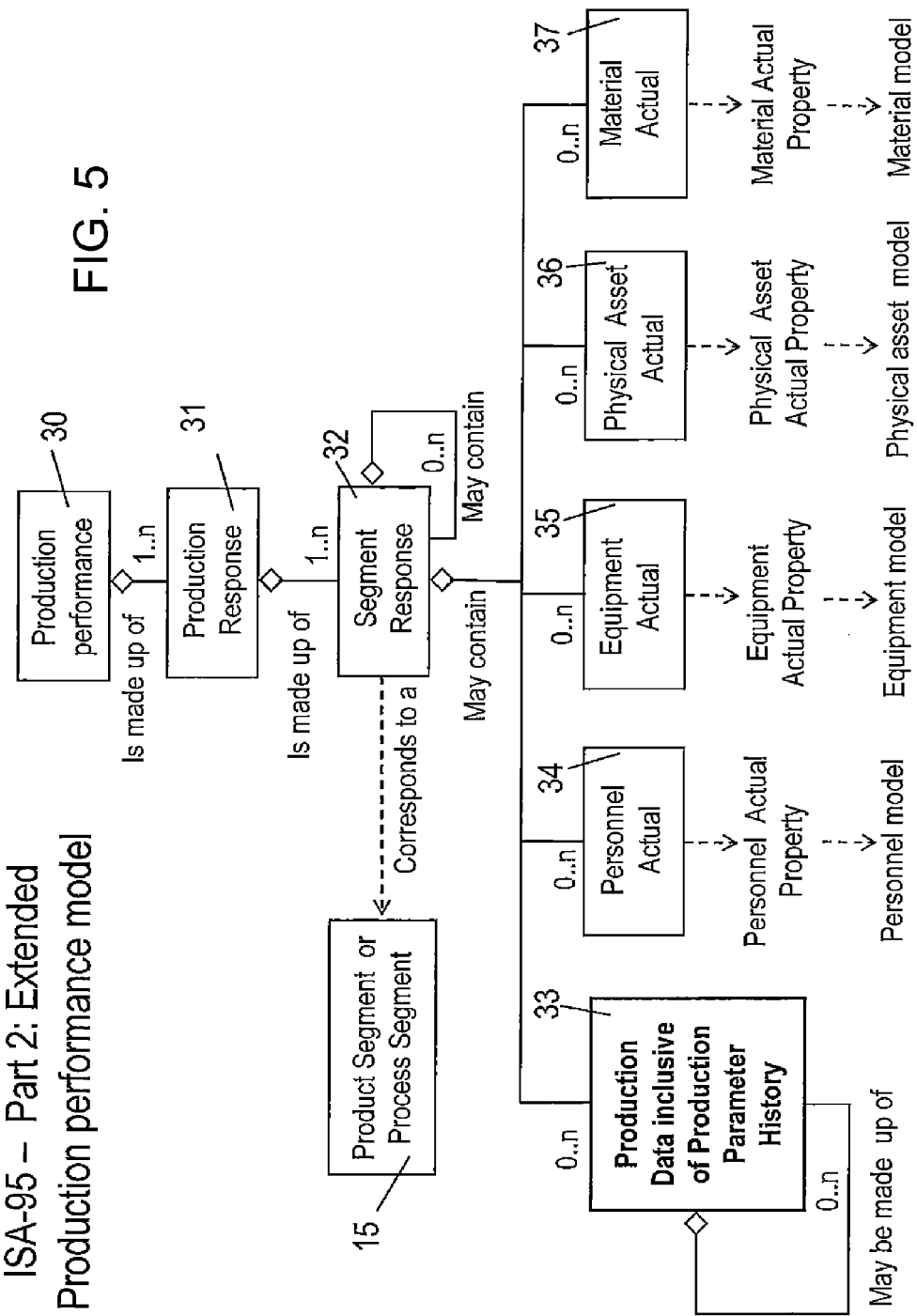
FIG. 5 is a view of the production performance model depicted in ISA-95, Part 2 extended according to the present invention.

As previously said, a Production Request 11 may be reported on by one or more production responses. The latter is part of the ISA-95 Production Performance Model extended as depicted in FIG. 5. A Production Performance 30 is made up of one or more Production Responses 31. A Production Response 31 contains the items reported back to the business system 8, at the end of production or during production. The business system 8 may need to know intermediate production response statuses, rather than waiting for the final production response status, because of cost accounting of material produced or intermediate materials. In this perspective, a Production Response 31 may contain up to n Segment Response 32 each corresponding to Product Segment or Process Segment 15. The attributes of a Segment Response 32 follow those of Segment Requirement 13 (FIG. 4), and therefore the two models have substantially the same structure. In detail, a Segment Response 32 may contain actual information about Personnel 34, Equipment 35, Physical Asset 36, Material 37, and Production Data 33 relevant to a Production Parameter 16 inclusive of Production Parameter History 26 of that Production Parameter. Examples of production data are:

a customer order-number associated with the production request;
specific commercial notes from operations related to the customer order, such as order complete, order incomplete, or an anticipated completion date and time;
quality information;
certification of analysis;
procedural deviations, such as an identification of an event used in another system and alarm information;

process behavior, such as temperature profiles, percentage of usage;

operator behavior, such as interventions, actions, and comments.

An example of the included Parameter History 26 is directed to a production parameter MIXER1-PERFORMANCE, which measures the daily percentage of usage of the equipment MIXER1. The actual value of this production parameter in date [2012-06-13] is 97%. The history of MIXER1-PERFORMANCE to be communicated to the business software 8 concerns the preceding four days: [2012-06-12], [2012-06-11], [2012-06-10], [2012-06-09]. The corresponding XML format included in the B2MML is:

```
<PARAMETER>
    <NAME>MIXER1-PERFORMANCE</NAME>
    <VALUE>97</VALUE>
    <UoM>%</UoM>
    <HISTORY>96;96;99;100</HISTORY>
    <HISTORYTIME>[2012-10-09]; [2012-10-10]; [2012-10-11]; [2012-10-12]<HISTORYTIME>
</PARAMETER >
```

Figures 6A, 6B:
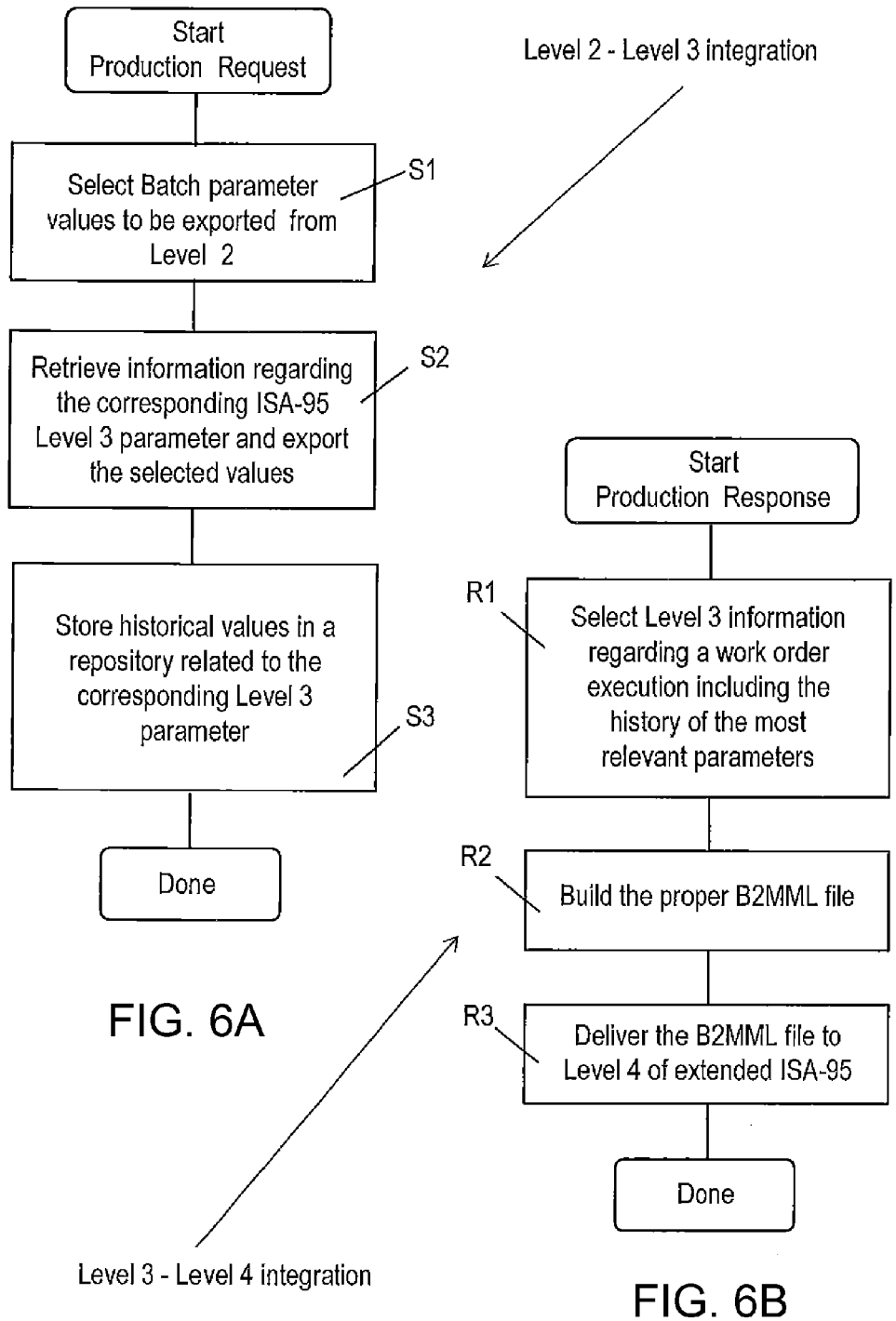
FIGS. 6A and 6B are flowcharts of the method for handling batch production parameters within production scheduling executed by the system of FIG. 3.

FIG. 6A describes the production of the new historian record 26 by the MES unit 5. The historian record grows up concomitantly with the production process for a new product, namely at each Production Request 11 within the Production Schedule 10. With reference to FIG. 6A, during the execution step S1 the EXP routine of FIG. 3 is charged to select batch parameters values to be exported from Level 2 to Level 3 of "Multilevel Hierarchy of activities" depicted in FIG. 1. The selected batch values are the ones most relevant for the MES. In this context "exportation" assumes the meaning of integration of Level 2 information within Level 3 of ISA-95. In step S2 the EXP routine is charged to model the Batch procedural element as Segment Requirement, since this Level-3-entity already provides all the system fields to store the batch information. Substantially, the batch values are written into corresponding field of Segment Requirement 13. For example, if the batch operation is mixing, at the conclusion of the exportation process the Segment Requirement 13 has the following specifications:

ID=MIX001
Name=Mixing
StartTime=20/06/2012 10:32:09
EndTime=20/06/2012 11:34:12
Type=Automatic
Unit=Mixer09

Step S3 is charged to store in the repository 9 sequential values of the production parameters exported as explained above.

A parameter "UnitUsagePercentage" may be associated to the mixing operation; this parameter can be calculated as the difference between EndTime and StartTime values stored in the repository 9 compared to a predetermined time interval. The "UnitUsagePercentage" thus obtained may be stored in the repository 9 for that mixer equipment. If the mixing operation in date Jun. 20, 2012 has been executed for only one hour a day, as indicated above, then the value of "UnitUsagePercentage" will be about 4% a day. Instead, if the mixer is working for more than one period a day, the values of "UnitUsagePercentage" is better to be accumulated within the 24 hours in order to obtain a daily percentage more suitable for historian. Daily compressed values of "UnitUsagePercentage" progressively stored in the repository 9 constitute the "Production Parameter History" 26.

FIG. 6B describes the forwarding of the new historian record 26 to the ERP unit 8. The latter is interested to know the performance of the scheduled production, so it solicits a Production Response 31 to the MES unit 5. Step R1 is charged to select all information regarding the work order execution for the given Production Request 11. The collected information elements may concern actual values of: Personnel 34, Equipment 35, Physical Asset 36, Material 37, Production Data 33 inclusive of the associated Production Parameter History 26. In the next step R2 a B2MML file is built using information elements collected during the previous step R1. In step R3 the REP routine is charged to deliver this B2MML file to the ERP unit 8, with that Level 3 information is integrated within Level 4 of ISA-95.

Although the invention has been described with particular reference to a preferred embodiment, it will be evident to those skilled in the art, that the present invention is not limited thereto, but further variations and modifications may be applied without departing from the scope of the invention as defined by the annexed claims.

The invention claimed is:

1. A method for handling batch production parameters within production scheduling, the method comprising performing the following steps with a data processor:
   a) modeling a production process in response to a production request by adopting predetermined product production rules for decomposing the process into segments of process or product, wherein each of the segments may contain requirements selected from the group consisting of production parameters, personnel, equipment, physical assets, materials, and any parameter needed for building a segment of product or process within an ISA-95 standard, wherein step a) comprises modeling at least one of the segments to contain an additional requirement constituted of production parameter history;
   b) executing the scheduled production for the production request and while performing the executing step:
   c) exporting batch values of a given subset of batch production parameters most relevant for production control into similarly specified fields of production parameters contained in respective ones of the segments of product or process;
   d) storing sequential values of exported batch production parameters in a database, wherein the database is configured to be queried by a planning entity in charge of planning the enterprise resources; and
   e) providing a report to the planning entity with information regarding the execution in progress at step b), the report including an additional information element constituted by a selection of historical values of at least one of the exported batch production parameters, the report exploiting instances of a response model with a structure corresponding to a segment of process or product extended to include the additional information element;
   wherein the production parameters include at least one parameter selected from the group consisting of: quality limits, set points, targets, specific customer requirements, final disposition of a produced product, transportation information; and other information not directly related to control.

2. The method according to claim 1, wherein the report contains instances of a response model with a structure according to an ISA-95 production performance model appositely extended to host the additional information element.

3. The method according to claim 1, wherein the historical values are compressed values over predetermined time intervals.

4. The method according to claim 1, which comprises describing the process or product segment requirements with an XML format including history tags.

5. A system for handling batch production parameters within production scheduling, the system comprising:
- a first data processor executing enterprise resource planning software having instructions for scheduling a production process in response to a production request;
- a second data processor executing manufacturing execution system software having instructions for controlling and monitoring an execution of the production process by operating a plurality of production components located at a shop floor;
- wherein said first and second data processors are configured to exchange information during reciprocal transactions by way of a two-way communication protocol;
- wherein a first routine of the MES software is configured for implementing predetermined product production rules for modeling the production process in response to a production request, by decomposing the process into segments of process or product, wherein each of the segments may contain requirements selected from the group consisting of production parameters, personnel, equipment, physical assets, materials, and any parameter needed for building a segment of product or process within an ISA-95 standard, and wherein at least one of the segments is modeled to contain an additional requirement constituted of production parameter history;
- wherein a second routine of the MES software is configured for exporting batch values of a subset of batch production parameters most relevant for production control into similarly specified fields of production parameters contained in respective segments of product or process;
- a database accessible by said second data processor for saving sequential values of each exported batch production parameter, said database being connected to be queried by said first data processor;
- wherein a third routine of the MES software is configured to provide to said first processor a report with information regarding a progress of a production process execution, the report including an additional information element constituted by a selection of historical values of at least one of the exported batch production parameters, the report exploiting instances of a response model with a structure virtually conforming to a segment of product or process; and
- wherein the production parameters include at least one parameter selected from the group consisting of: quality limits, set points, targets, specific customer requirements, final disposition of a produced product, transportation information; and other information not directly related to control.

6. The system according to claim 5, wherein the report has a structure defined by the ISA-95 production performance model appositely extended to host the additional information element.

* * * * *